United States Patent [19]

Berkhof

[11] Patent Number: 4,671,457
[45] Date of Patent: Jun. 9, 1987

[54] METHOD AND APPARATUS FOR CONTROLLING ROOM TEMPERATURE

[75] Inventor: Hendrikus Berkhof, Emmen, Netherlands

[73] Assignee: Honeywell B.V., Emmen, Netherlands

[21] Appl. No.: 866,429

[22] Filed: May 23, 1986

[30] Foreign Application Priority Data

Jul. 6, 1985 [DE] Fed. Rep. of Germany ....... 3524230

[51] Int. Cl.⁴ ................................................ F23N 5/20
[52] U.S. Cl. ................................. 236/46 R; 236/78 D
[58] Field of Search .............. 236/46 R, 11, 10, 78 D, 236/46 F; 165/12; 62/231

[56] References Cited

U.S. PATENT DOCUMENTS 4,460,123 7/1984 Beverly ............................ 236/46 R
4,509,585 4/1985 Carney et al. ..................... 236/46 R Primary Examiner—William E. Wayner
Attorney, Agent, or Firm—Mitchell J. Halista; Albin Medved

[57] ABSTRACT

A control method uses a room thermostat for generating an output signal representative of an energy demand and an energy source which can be cyclically switched on and off and includes the steps of determining within a switching cycle of the energy source the actual switch on period, comparing the actual switch on period with an adjustable desired switch on period within the cycle to produce a control signal representative of the energy demand and controlling the energy source in accordance with the control signal. An apparatus utilizing this method uses a first adjustable timer for setting a cycling time period, a second adjustable timer for setting a desired switch on period within each cycling period, a time measuring unit for measuring the actual switch on time of an energy source in response to a room thermostat establishing an energy demand, a comparator for comparing the actual switch on time with the desired switch on period to produce a representative control signal and a control element responsive to the control signal for correspondingly changing the rate of energy supplied by the energy source.

5 Claims, 3 Drawing Figures

METHOD AND APPARATUS FOR CONTROLLING ROOM TEMPERATURE

BACKGROUND OF THE INVENTION

1. Field of the Invention

This invention relates to a method and control apparatus for a heating or cooling system using an energy source which can be cyclically switched on and off. More specifically, the present invention is directed to a room temperature control apparatus and method utilizing a thermostat control of an energy source.

2. Description of the Prior Art

Several methods are well-known for controlling the heat supply or cooling of buildings and rooms in a fashion where energy is saved and simultaneously the room temperature is kept substantially constant. With one of those methods in a heating control, the temperature of a hot water supply is controlled dependent on the outside temperature of the room or building, and in the individual rooms radiator thermostats are provided which control the heat supplied by the hot water to the respective rooms dependent on the temperature setting of the thermostat. The temperature of the hot water supply is changed by either cyclically switching a hot water heating burner on and off or by continuously adjusting a hot and cold water mixing valve. In both cases, the room temperature sensor does not directly control the heat source, e.g., the burner, but the temperature sensor can only either supply the heat generated by the heat source to the room or can interrupt the heat supply to a room dependent on the heat demand. Such a temperature control of the supply water dependent on outside temperature does not take into consideration several factors which influence the heat demand, e.g., the thermal isolation and the heat storage capacity of the building, the influence of incident sunshine, the cooling effect of strong wind or rain as well as all those influences which depend on the utilization of the room, such as the opening and closing of windows, the opening and closing of radiator valves, changes of the setpoint of other room thermostats, night setback, the heat generation of electrical apparatus and lamps, as well as the occupation of the room with a few or many people. Such a temperature control of the supply water therefore cannot achieve an optimum usage of the energy of the fuel supplied to the burner.

In other known heating systems, the burner or another source of heat is directly switched on and off by a room thermostat which is located in the most important room of the building, i.e., in the case of a home or dwelling it is usually located in the living room. When the burner is switched on, it runs at full heating capacity, even if only a small temperature difference between the set point and the actual value has to be overcome. In this case, the burner runs only for a short period of time. This, however, means that in the case of small heat demand the burner is seldom switched on and then only for very short time intervals. Since some time elapses until the heat energy generated by the burner has heated up in the heat exchanger the heat supply medium, in most cases hot water, and this medium reaches the room where the thermostat is located and the thermostat can sense an increase of the room temperature above the preset set point and then can switch off the burner, excess heating energy is generated which actually is not required. One conventional attempt to overcome this deficiency uses a room thermostat with a so-called thermal feedback or heat anticipator where, when the thermostat is switched on, an electrical resistor increases the ambient temperature of the temperature sensor in the thermostat before the room temperature itself really increases. The result of this measure is not wholly satisfactory in many cases because the time delay between a switching on of the burner and the start of heating up of the room depends essentially on the kind and dimensioning of the heating installation and also on the volume of the room. In particular, with long piping between the burner or the boiler and the living room, completely satisfactory temperature control and energy use efficiency results cannot be achieved.

Furthermore, European Pat. No. 012,936 describes a method for optimizing the energy consumption in a building by measuring the period of time which the heating installation requires for heating up the building from a low night temperature to a higher room temperature at the beginning of the occupation time of the building. This measured period of time is then used in connection with the building outside temperature for calculating the heat up time required on the next morning.

Finally, German Pat. No. 1,615,500 shows an apparatus for automatically controlling the charging system of a storage heating installation. The heat storing system is charged through a predetermined time interval during the night hours, while during the day the stored heat is discharged to the room which has to be heated by means of a fan which is controlled by a room thermostat. In order to avoid an unnecessary loss of heat, the storage system is to be charged each time only with such an amount of heat as will most probably be required for the next day. For this purpose, switching means are provided which switch on the charging device during the night hours for such a period of time which depends on the operating time of the fan during the preceding day. This operating time of the fan can be calculated easily by summing the contact closure time intervals of the room thermostat.

SUMMARY OF THE INVENTION

It is the object of the present invention to provide a temperature control method and apparatus which without an additional outside temperature sensor achieves an energy saving room temperature control without hunting by directly regulating the heat source.

In accomplishing this and other objects, there has been provided, in accordance with the present invention a control method using a room thermostat for generating an output signal representative of an energy demand and an energy source which can be cyclically switched on and off and includes the steps of determining within a switching cycle of the energy source the actual switch on period, comparing the actual switch on period with an adjustable desired switch on period within the cycle to produce a control signal representative of the energy demand and controlling the energy source in accordance with the control signal. An apparatus utilizing this method uses a first adjustable timer for setting a cycling time period, a second adjustable timer for setting a desired switch on period within which cycling period, a time measuring unit for measuring the actual switch on time of an energy source in response to a room thermostat establishing an energy demand, a comparator for comparing the actual switch on time with the desired switch on period to produce a representative control signal and a control element responsive to the control signal for correspondingly changing the rate of energy supplied by the energy source.

BRIEF DESCRIPTION OF THE DRAWINGS

A better understanding of the present invention may be had when the following description is read in connection with the accompanying drawings, in which.

DESCRIPTION OF THE PREFERRED EMBODIMENT

The present invention makes use of the time intervals during the cyclical opening and closing of the room thermostat switch for determining the actual demand of heat. Therewith even those factor influencing heat demand values are automatically taken into account which in a heating control system using only outside temperature sensing remain out of consideration. Furthermore, the burner is operated with its optimum efficiency and there is no generation of unneeded heat. This is a significant improvement with respect to the desired equalization of the room temperature as well as with respect to energy utilization. By the fact that the switch on intervals of the heat source are not dependent on the actual demand of heat but are preset by a predetermined switching cycle, it is possible to derive a measured value corresponding to the demand of heat and given as a period of time from the switch off interval of the heat source within each switch on cycle. This measured value then by comparison with a desired adjustable switch on period per switching cycle can generate an error signal which controls the burner capacity or, in general terms, the supplied amount of heat per time unit in such a way that the desired switch on period within each switching cycle is reached. In this manner, without an additional outside temperature sensor, values influencing the temperature within the room are automatically sensed and considered for determining the amount of heating or cooling energy, respectively, which has to be supplied to the room. A precondition for the use of the new control apparatus is a modulating or pulse-wise operation of an energy source whose heat energy generation can be controlled. In the case of a burner, either the fuel supply can be modulated separately or in combination, for further optimizing the energy utilization, the combustion air supply is concurrently controlled. In case of a hot water heating system, a mixing valve, and, in the case of a hot air heating system, a damper can control the supply of energy to the room.

Figure 1:
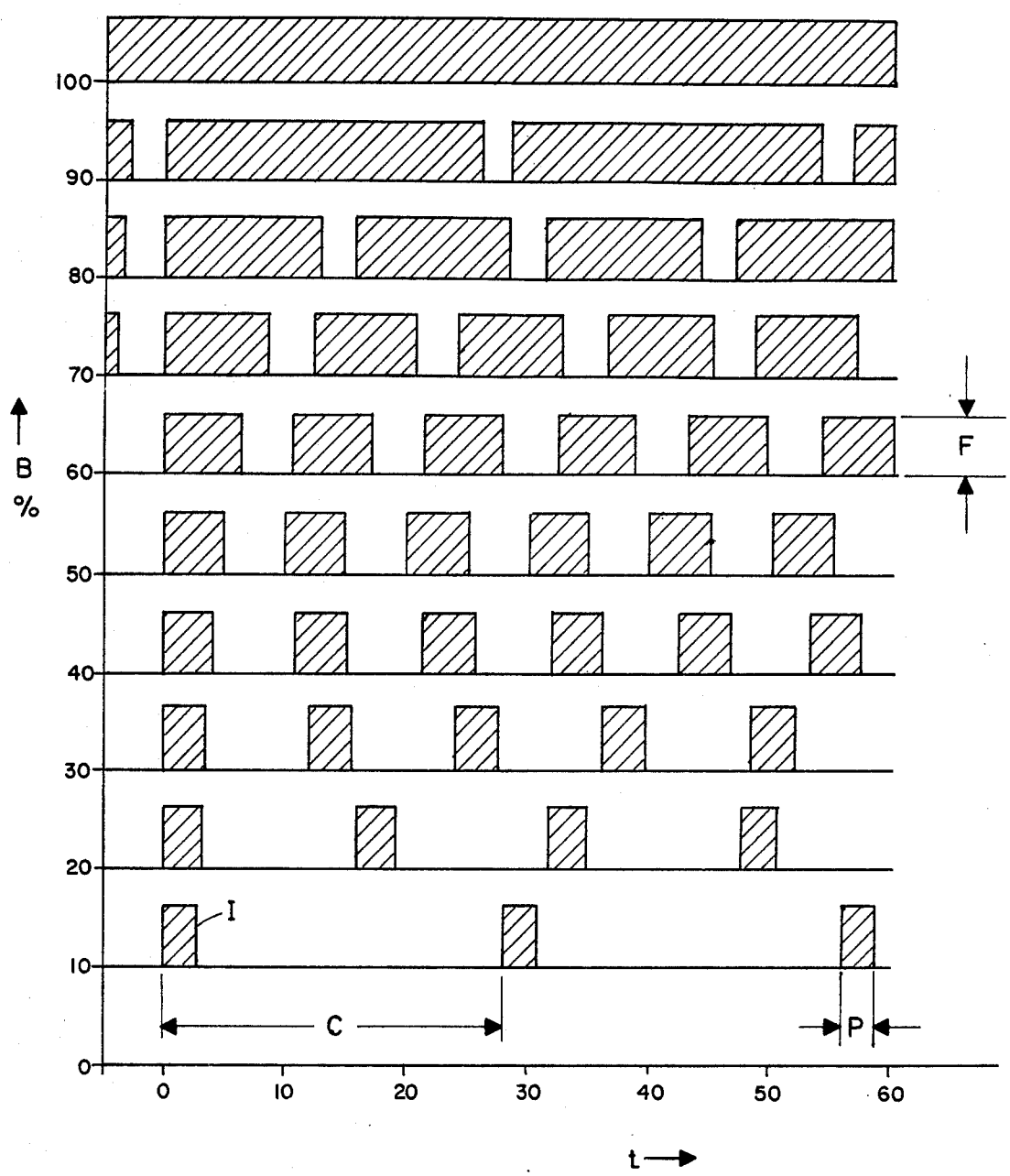
FIG. 1 shows a set of representative curves of the switching cycles of a burner dependent on the demand of heat in a prior art temperature control system for a burner.

In FIG. 1, there is shown a set of representative curves of the switching cycles of a prior art temperature control system. Specifically, the individual switch on intervals I of a burner dependent on the demand of heat "B" are represented as a percentage of the maximum burner capacity in relation to time "t". In the uppermost curve, the example is represented when at very low room temperature the burner operates continuously with full capacity, i.e., B=100%. In the lowest curve, the burner is switched on very seldom and only for short time intervals "P". With increasing demand of heat, the time interval "C" between two subsequent switch on periods, i.e., the length of the switch cycle changes as well as the switch-on period "P" within each of the switch cycles. If the switching cycle "C" of the bottom curve at 10% demand of heat is projected to the curve at 60% demand of heat, it is seen that at the latter instead of a single relative short switch on interval during the same period "C" three switch on intervals of double length are present. This means that compared to the curve at 10% demand of heat the curve at 60% provides an amount of heat which is six times larger. The heat capacity "F" which is the amplitude of the individual switch on pulses is identical in all cases.

Figure 2:
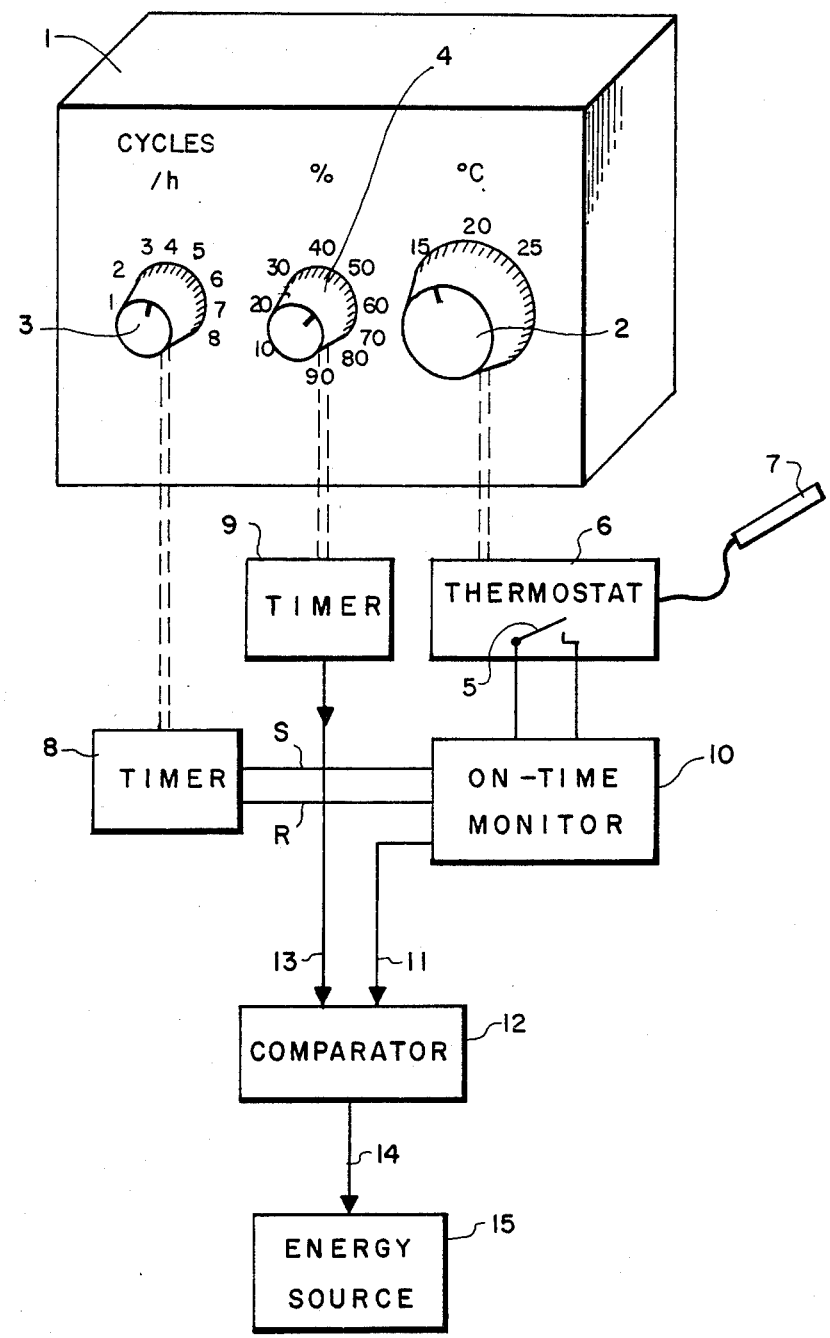
FIG. 2 shows a block diagram of an example of a control apparatus embodying the present invention.

In particular at low demand of heat, the supply of heat with full capacity very often leads to "hunting" of the temperature. Between the time of heat generation by the burner and the reaction of the room thermostat, a period of time elapses which is caused by the required heating up of the heat transmission medium, in most cases water, within the heat exchanger, the transport of the heated water to the room and its radiators as well as by the heating up of the room air. In most cases, the switch on pulses will be too long for the required demand of heat and as a consequence the room temperature after the above-mentioned delay time will exceed the set point temperature essentially. Such temperature fluctuations are not only inconvenient, but simultaneously mean an increased consumption of energy supplying fuel such as gas or oil. The length "C" of the cycles depends further on several influencing factors. If, for example, additional heat is generated within the room which has to be heated, e.g., by sun radiation, switching on of lamps or by machines, the switch on intervals of the burner will be shortened with a simultaneously stretching of the individual switching cycles "C". The resulting frequent switching "on" and "off" of the burner is unfavorable also because of the danger of undesired condensate formation. FIG. 1 also shows that with respect to a predetermined switching cycle "C" the switch on period "P" is proportional to the demand of heat "B" (see above comparison of the curves at 10% and 60%). FIG. 2 shows a block diagram of an example of the present invention and includes, schematically, the housing 1 of a room thermostat having three adjusting knobs on its front surface. With the righthand adjusting knob 2, the temperature setpoint is adjusted. In addition, night setback may be provided. The lefthand adjusting knob 3 is used for setting a predetermined number of switching cycles per hour or per another unit of time. This adjustment is made by the installer of the system and depends mainly on the surrounding climate and the environmental conditions. In areas with a cold climate, it is preferable to select shorter switching cycles than in areas with a moderate climate and small fluctuations of outside temperature.

The central adjusting knob 4 is used for setting a desired switch on period within each switching cycle measured in percent. Also, this adjustment normally is done by the installer of the heating system and depends mainly on the properties of the heating system, in particular, on the distance between burner and measuring room, the flow cross-section of the piping, the pump capacity and other factors influencing the heat transmission. The room thermostat 1 further includes a thermostat switch 5 which is actuated by the temperature measuring system 6. This receives as an input signal the signal of temperature sensor 7 which is provided inside or outside of the housing 1 of the room thermostat. On the other hand, this temperature measuring system 6 receives the setpoint value as adjusted by means of adjusting knob 2. The temperature sensor 7 and the adjusting knob 2 may act on an expansion capsule or a bimetal temperature sensor in a well-known manner. For this purpose, other types of temperature sensors such as electronic temperature sensors may be used. Accordingly, the means for setting the setpoint can operate in either analog or digital fashion.

The other modules of the temperature controller shown below housing 1 may be provided either within the thermostat housing 1 or separately in a second housing (not shown). For clarity in explaining the present invention, they are shown below the housing 1. By means of the adjusting knob 3, the number of switching cycles per hour is adjusted by means of a first timer 8. A second timer 9 is adjusted by means of knob 4 to the desired switch-on period of the energy source within each switching cycle. The first and second timer 8,9 may each be any suitable presettable timing device, such devices being well-known in the art. The actual switch-on period of the energy source is measured by monitoring the closure time interval of switch 5. For this reason, a counter 10 is connected to the mechanism which operates switch 5 or, in the case of an electronic switch, is connected to the control circuit operating such electronic switch. The counter 10 counts clock signals from a clock (not shown) to measure the closure interval of the switch 5 during each switching cycle. For this purpose, counter 10 is connected by means of a set line "S" and a reset line "R" to timer 8 and is set at the beginning of each switching cycle and is reset at the end of the switching cycle. In some cases, a single reset line "R" might be sufficient.

A common clock source can be used to operate the first and second timers 8,9 and the counter 10. The counter 10 delivers on line 11 an output signal which is proportional to the closure time interval of switch 5 within each switching cycle. This can be an analog signal or a digital signal. This signal is fed to a comparator 12 which via line 13 is also supplied with a setpoint signal from the second timer 9, with the setpoint signal corresponding to the desired switch on period with each switching cycle. The setpoint signal is adjusted by means of knob 4. The energizing coil (not shown) of a solenoid valve operator is connected to the thermostat switch 5, and this solenoid valve operates a burner control apparatus for supplying a burner 15 with combustion gas, such a gas control apparatus is well-known in the prior art.

The comparator 12 derives an error signal corresponding to the difference of the timing signals which it receives from the counter 10 and from the second timer 9. This error signal indicates whether the burner 15 within the corresponding switching cycle was in operation for a longer or for a shorter period of time than the predetermined switch-on period. This error signal of line 14 is forwarded to a modulating operator of a gas pressure regulator as shown in European Pat. No. 3,015,980 for the burner 15. With this modulating operator, the burner capacity, i.e., the gas or oil volume fed to the burner 15 within a unit of time is changed, i.e., the flow cross-section of the fuel valve is controlled. If the burner 15 during the last switching cycle was in operation for a longer period of time than the preset time, the burner capacity will be increased by such an amount that the desired switch on period within each cycle is reestablished. Vice versa, if the operation period of the burner 15 was shorter than the desired switch-on period, the burner capacity is decreased and therewith the switch on period until the set point temperature is reached is prolongated.

For example, assume that the adjusting knob 3 is adjusted to six switching cycles per hour which means that the cycling time is ten minutes. By means of the adjusting knob 4, a switch on period of 70% per switching cycle is adjusted which means that in each cycle of ten minutes the burner 15 is expected to run for seven minutes. The actual running period of the burner 15 depends as usual on the room temperature measured by temperature sensor 7. When the temperature reaches the setpoint as adjusted by means of knob 2, the burner 15 is switched off, i.e., its switch on period is terminated. If the actual switch on period per cycle as measured by counter 10 is longer than the preset switch on period as given by second timer 9, the comparator 12 will deliver an output signal on line 14 to the modulating operator of the burner 15 with the output signal corresponding to the relation of the actually measured switch on period "p" to the desired switch on period "Q". For example, if the measured switch on period is nine minutes and the desired switch-on period is seven minutes, the fuel volume fed to the burner 15 per unit of time is increased by means of operator 12 by a factor 9/7. If the measured switch-on period is longer than one cycle, the supply of fuel is increased in the relation of one cycle/Q, and this is repeated until "p" becomes smaller than one cycle. If, on the other hand, the actual switch on period "p" is shorter than the desired switch-on period "q", the fuel flow through the fuel valve is reduced by a corresponding factor, e.g., 5/7. If the room thermostat during an entire cycle does not demand a supply of heat, the adjustment of the fuel valve is reduced to a predetermined minimum flow rate.

Instead of the adjusting knobs 2,3,4, a digital keyboard may be used which by the utilization of corresponding preselected keys can be switched to effect the different aforesaid functions. A digital indicator may also be associated with such a keyboard and may be switchable to provide different indicator functions. The function of the two timers 8 and 9, the counter 10 and the comparator 12 can easily be accomplished by a preprogrammed microprocessor. If a burner operator 15 is used which can be digitally controlled, the comparator 12 could act directly upon such an operator. If such a burner 15 is not used, then a digital-to-analog converter would be used to convert the digital output of the microprocessor before application to the burner 15. The invention can also be utilized with prior art mechanical and electromechanical components such as timers, the actual position of which is represented by the position of the slider of a potentiometer. Electrical voltages or currents corresponding to the potentiometer adjustment would in this case be supplied to the comparator 12.

Figure 3:
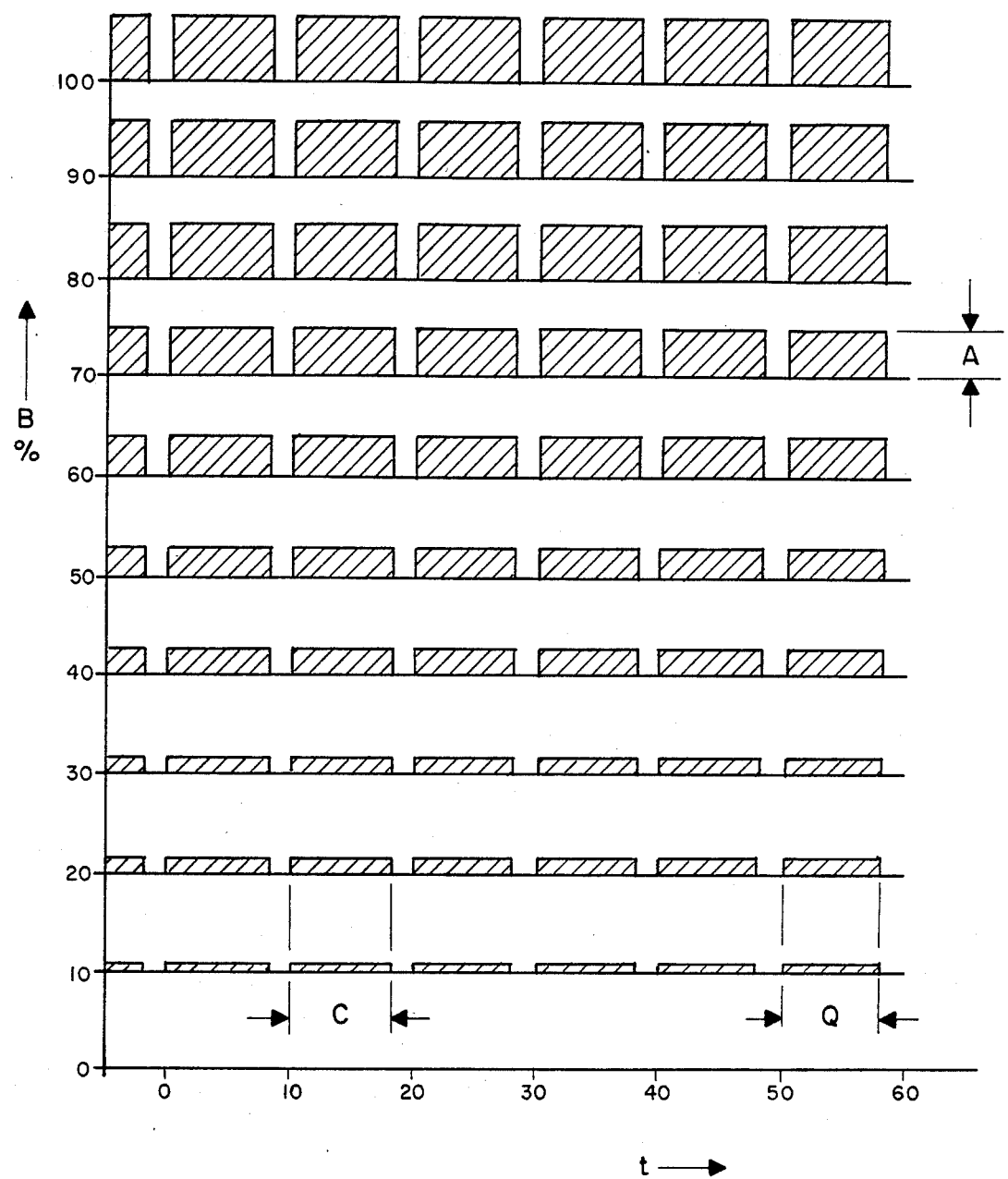
FIG. 3 shows a set of representative curves of the switching cycles of the control apparatus shown in FIG. 2.

The result of the above described operation can be seen clearly from the cycles of operation of the present invention shown in FIG. 3. Independent of the demand of heat "B" in the balance position of the control apparatus, the cycling time "C" as well as the switch on period "Q" within each switching cycle remain constant. The supplied fuel volume A per unit of time, i.e., the flow rate of the fuel valve or the position of a mixing valve is changed. If there is low demand of heat, the burner 15 is operated with a lower capacity and if there is a high demand of heat, the burner 15 operates with a high capacity. The amount of combustion air is adjusted accordingly. By comparing FIGS. 1 and 3, it may be seen that the present invention provides an equalization of the operating cycles, whereby the maintenance of a desired setpoint temperature is facilitated and improved, and the fuel consumption is reduced. FIG. 3 also shows a quasistationary condition of the control system when the predetermined switch on period and the measured switch on period per switching cycle are the same. As mentioned above, if the demand of heat changes, deviations of the measured switch on period will appear which are compensated during the following cycle by a corresponding adaptation of the fuel rate "A". With a change of the demand of heat, e.g., from 20% to 30% of the maqximum available amount of heat, the actual curve moves from the line corresponding to 20% after a transmission cycle to the line corresponding to 30%. It should be noted that the aforesaid invention may also be used with equal success for controlling a cooling operation.

Accordingly, it may be seen that there has been provided, in accordance with the present invention, an improved method and apparatus for temperature control.

The embodiments of the present invention in which an exclusive property or privilege is claimed are defined as follows:

1. Apparatus for controlling room temperature comprising
   a room thermostat,
   an energy source which can be cyclically switched on and off,
   a first adjustable timer means for setting a desired cycling time period for switching on said energy source,
   a second adjustable timer means for setting a desired switch on time period of said energy source within each said cycling period,
   a time measuring means for measuring the actual switch on period of said energy source in each cycling period, which switch on period depends on the energy demand as detected by said thermostat,
   a comparator means for comparing the actual switch on period with the desired switch on period in each cycling period, with said comparator means generating an output signal corresponding to the time difference of the compared time periods and
   a control means for changing the rate of energy supplied per time unit by said energy source dependent on said output signal.

2. An apparatus according to claim 1 wherein said time measuring means is controlled by said room thermostat.

3. An apparatus according to claim 1 the first and second timers, the time measuring unit and the comparator means are formed by a microprocessor.

4. An apparatus according to claim 1 wherein said first and second timers are each manually adjustable.

5. A method for generating an output signal representative of an energy demand for
   an energy source which can be cyclically switched on and off and includes the steps of
   determining within a switching cycle of the energy source the actual switch on period,
   comparing the actual switch on period with an adjustable desired switch on period within the cycle to produce a control signal representative of the energy demand and
   controlling the energy source in accordance with the control signal.

* * * * *